(12) United States Patent
Ito et al.

(10) Patent No.: US 12,497,756 B2
(45) Date of Patent: Dec. 16, 2025

(54) WORK MACHINE AND METHOD FOR CONTROLLING WORK MACHINE

(71) Applicant: Komatsu Ltd., Tokyo (JP)

(72) Inventors: Satoshi Ito, Tokyo (JP); Shota Nakamura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 119 days.

(21) Appl. No.: 18/285,266

(22) PCT Filed: Jun. 15, 2022

(86) PCT No.: PCT/JP2022/023948
§ 371 (c)(1),
(2) Date: Oct. 2, 2023

(87) PCT Pub. No.: WO2022/265038
PCT Pub. Date: Dec. 22, 2022

(65) Prior Publication Data
US 2024/0183126 A1  Jun. 6, 2024

(30) Foreign Application Priority Data

Jun. 18, 2021  (JP) .................................. 2021-101693

(51) Int. Cl.
*E02F 9/20* (2006.01)
*E02F 9/22* (2006.01)
*E02F 9/26* (2006.01)

(52) U.S. Cl.
CPC .......... *E02F 9/2033* (2013.01); *E02F 9/2066* (2013.01); *E02F 9/2228* (2013.01); *E02F 9/2235* (2013.01); *E02F 9/2296* (2013.01); *E02F 9/268* (2013.01)

(58) Field of Classification Search
None
See application file for complete search history.

(56) References Cited

U.S. PATENT DOCUMENTS

| 8,554,401 | B2 | 10/2013 | Satake et al. | |
|---|---|---|---|---|
| 2010/0100274 | A1 | 4/2010 | Satake et al. | |
| 2010/0170239 | A1* | 7/2010 | Sora | E02F 9/2091 |
| | | | | 60/459 |
| 2013/0255244 | A1 | 10/2013 | Shin et al. | |
| 2015/0240449 | A1* | 8/2015 | Park | E02F 9/2203 |
| | | | | 701/50 |
| 2015/0354440 | A1* | 12/2015 | Lim | F16K 31/02 |
| | | | | 123/90.11 |

(Continued)

FOREIGN PATENT DOCUMENTS

| CN | 101622460 A | 1/2010 | |
|---|---|---|---|
| DE | 112010004874 T5 * | 10/2012 | ............... B60R 1/00 |

(Continued)

*Primary Examiner* — Amelia Vorce
(74) *Attorney, Agent, or Firm* — Troutman Pepper Locke LLP

(57) ABSTRACT

A work machine having working equipment includes a power source that outputs a driving force for operating the working equipment, a controller, and a solenoid valve controlled by the controller. When it is determined that an abnormality has occurred in the power supply circuit connecting the controller and the solenoid valve, the controller outputs a command for controlling the power source so as to limit an operation of the working equipment.

17 Claims, 3 Drawing Sheets

(56) References Cited

U.S. PATENT DOCUMENTS

| | | | | |
|---|---|---|---|---|
| 2016/0290369 | A1* | 10/2016 | Opdenbosch | F02D 29/04 |
| 2021/0010241 | A1* | 1/2021 | Nishi | E02F 9/2285 |
| 2021/0047808 | A1* | 2/2021 | Yamada | E02F 9/268 |
| 2022/0002976 | A1* | 1/2022 | Fukuoka | E02F 9/16 |
| 2022/0010820 | A1 | 1/2022 | Kondo et al. | |
| 2022/0178111 | A1* | 6/2022 | Nanbu | E02F 9/2058 |
| 2022/0196043 | A1* | 6/2022 | Sizemore | F15B 19/005 |
| 2022/0282456 | A1* | 9/2022 | Watanabe | B60L 3/0092 |

FOREIGN PATENT DOCUMENTS

| | | |
|---|---|---|
| JP | 2010116708 A | 5/2010 |
| JP | 2013-129969 A | 7/2013 |
| JP | 2013-257211 A | 12/2013 |
| JP | 2017-129067 A | 7/2017 |
| JP | 6269621 B2 | 1/2018 |
| JP | 2019-097022 A | 6/2019 |
| JP | 2019-156259 A | 9/2019 |
| JP | 2019206878 A | 12/2019 |
| JP | 2020-117897 A | 8/2020 |
| JP | 2020-128778 A | 8/2020 |
| KR | 19980041623 A | 8/1998 |

\* cited by examiner

WORK MACHINE AND METHOD FOR CONTROLLING WORK MACHINE

FIELD

The present disclosure relates to a work machine and a method for controlling a work machine.

BACKGROUND

In order to cope with functional safety of a work machine such as an excavator, there is a function of detecting an abnormality by a controller and interrupting an electric circuit when the abnormality occurs inside the controller.

CITATION LIST

Patent Literature

Patent Literature 1: JP 2019-097022 A

SUMMARY

Technical Problem

In a work machine, it is desirable to control the work machine to further enhance safety not only when an abnormality occurs inside a controller but also when an abnormality occurs in a power supply circuit outside the controller.

Solution to Problem

According to an aspect of the present invention, a work machine having working equipment, the work machine comprises: a power source that outputs a driving force for operating the working equipment; a controller; and a solenoid valve controlled by the controller, wherein the controller outputs a command for controlling the power source so as to limit an operation of the working equipment when it is determined that an abnormality has occurred in a power supply circuit connecting the controller and the solenoid valve.

According to another aspect of the present invention, a method for controlling a work machine having working equipment, the method comprises: outputting a command for controlling a power source so as to limit an operation of the working equipment when it is determined that an abnormality has occurred in a power supply circuit connecting a controller and a solenoid valve, the controller controlling the solenoid valve.

Advantageous Effects of Invention

The present disclosure provides a work machine and a method for controlling a work machine capable of controlling the work machine to further enhance safety even when an abnormality occurs in a power supply circuit outside a controller, in addition to when an abnormality occurs inside the controller.

DESCRIPTION OF EMBODIMENTS

Hereinafter, embodiments according to the present disclosure will be described with reference to the drawings. However, the present disclosure is not limited thereto. Components of the embodiments described below can be appropriately combined. Further, some components may not be used.

First Embodiment (Work Machine)

Figure 1:
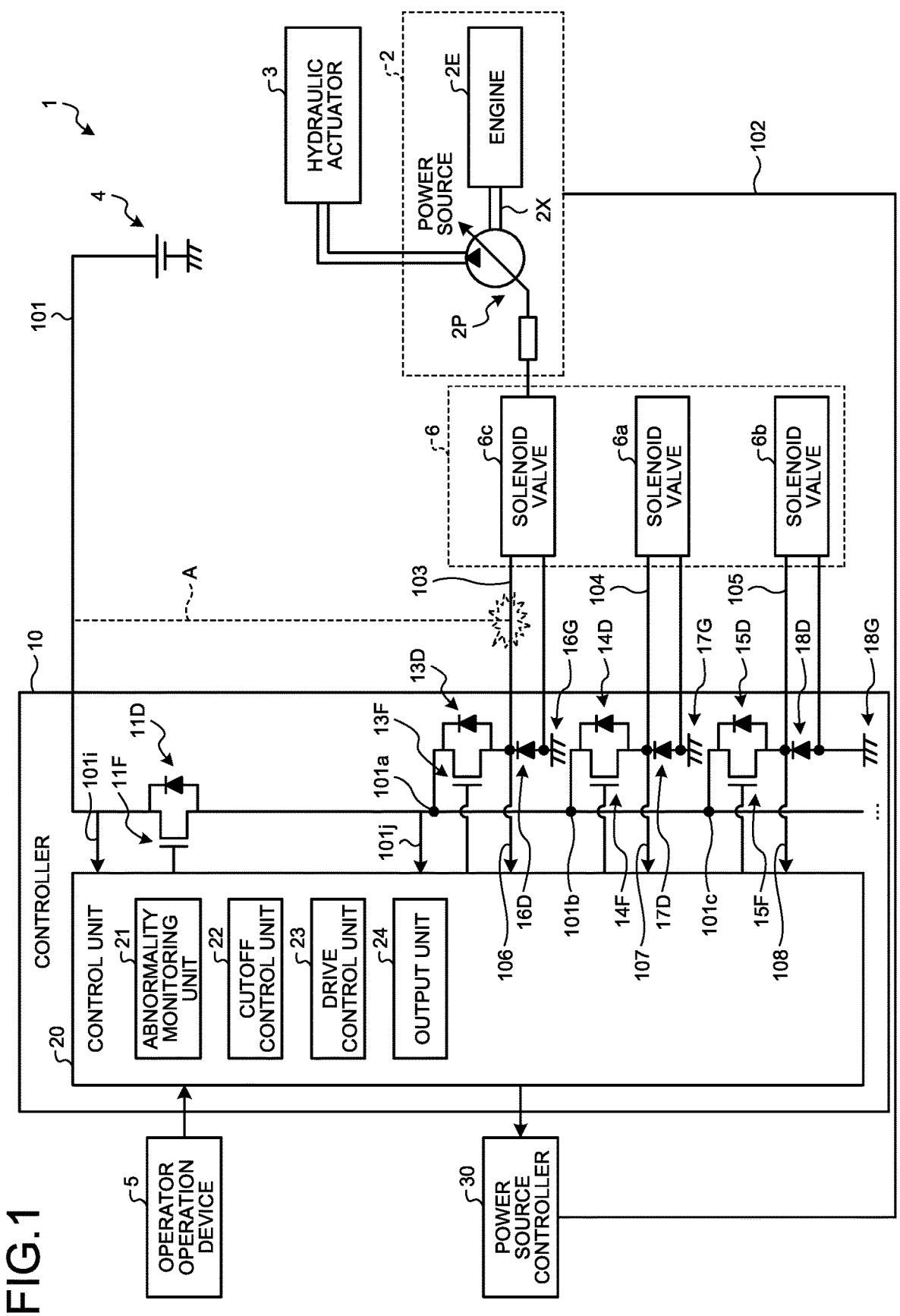
FIG. 1 is a schematic block diagram illustrating a work machine according to a first embodiment.

FIG. 1 is a schematic block diagram of a work machine 1 according to a first embodiment. In the present disclosure, the work machine 1 is an excavator. The work machine 1 includes a lower traveling body (not illustrated), an upper swinging body (not illustrated), working equipment (not illustrated), and a hydraulic cylinder (not illustrated) that drives the working equipment. The work machine 1 includes a power source 2, a solenoid valve 6, a battery 4 as a power source, and a controller 10. In the present disclosure, the work machine 1 includes a hydraulic actuator 3, an operation device 5, and a power source controller 30. In the present disclosure, the solenoid valve 6 includes two solenoid valves that are a solenoid valve 6a and a solenoid valve 6b as an example, in addition to a solenoid valve 6c connected to the power source 2. However, the solenoid valve is not limited thereto.

In the present disclosure, the work machine 1 may include a notification unit (not illustrated) that notifies an occurrence of abnormality in a power supply circuit outside the controller 10, in other words, a power supply circuit connecting the controller 10 and the solenoid valve 6. The notification unit is a notification device that notifies an operator in a driver's seat of an occurrence of abnormality in the power supply circuit outside the controller 10. The notification unit is, for example, a monitor or a buzzer provided in a cab of the work machine 1.

The power source 2 outputs a driving force for operating the working equipment. The power source 2 is controlled by a control signal from the power source controller 30. The power source 2 includes, for example, an engine, a generator, a fuel cell, a storage battery, an electric motor, a variable displacement pump, and the like. In the present disclosure, the power source 2 including an engine 2E and a variable displacement pump 2P will be described as an example.

The solenoid valve 6c is connected to the variable displacement pump 2P. The variable displacement pump 2P is, for example, a swash plate hydraulic pump that changes a pump capacity by changing a tilt angle of a swash plate, but the pump is not limited thereto. The variable displacement pump 2P is mechanically connected to a drive shaft 2X of the engine 2E. The variable displacement pump 2P is driven by driving the engine 2E. The variable displacement pump 2P serves as a supply source of hydraulic oil to the hydraulic actuator 3. In the present disclosure, an engine speed of the engine 2E is controlled by a control signal from the power source controller 30. In the present disclosure, in the variable displacement pump 2P, the tilt angle of the swash plate is controlled by a control signal from the controller 10.

The hydraulic actuator 3 is, for example, a hydraulic drive system such as a boom hydraulic cylinder, an arm hydraulic cylinder, a bucket hydraulic cylinder, a right traveling hydraulic motor, and a left traveling hydraulic motor. The hydraulic actuator 3 is driven by hydraulic oil supplied from the variable displacement pump 2P. When the hydraulic actuator 3 is driven, the working equipment including the boom, the bucket, and the arm connected to the hydraulic actuator 3, the lower traveling body, and the upper swinging body are operated. A control valve (not illustrated) for controlling the hydraulic actuator 3 is disposed between the hydraulic actuator 3 and the variable displacement pump 2P.

The battery 4 supplies power to the work machine 1. The battery 4 supplies power for driving the solenoid valve 6. In the present disclosure, the battery 4 supplies power for driving the solenoid valve 6a, the solenoid valve 6b, and the solenoid valve 6c. The battery 4 supplies power to the controller 10. An electric signal line 101 is electrically connected to the battery 4. The battery 4 is connected to the controller 10 via an electric signal line 101. The battery 4 is connected to the solenoid valve 6 via the electric signal line 101 and the controller 10. In the present disclosure, the battery 4 is connected to the solenoid valve 6a, the solenoid valve 6b, and the solenoid valve 6c via the electric signal line 101 and the controller 10. In a circuit that supplies power from the battery 4 to the controller 10, i.e., the electric signal line 101, a battery 4 side is referred to as an upstream side.

The operation device 5 is disposed in a driver's seat of the work machine 1. The operation device 5 is operated by the operator. The operation device 5 is, for example, an operation lever for operating a swing of the boom, the bucket, the arm, and the upper swinging body. The operation device 5 is, for example, an operation lever for operating a traveling hydraulic motor. The operation device 5 is, for example, a fuel dial. The operation device 5 is, for example, an operation switch for operating a swinging and parking brake.

The operation device 5 outputs, to a control unit 20, a signal indicating the operation of the operator. For example, the operation device 5 outputs, to the control unit 20, a boom operation signal indicating an operating direction and an operation amount of the boom. For example, the operation device 5 outputs, to the control unit 20, a bucket operation signal indicating an operating direction and an operation amount of the bucket. For example, the operation device 5 outputs, to the control unit 20, an arm operation signal indicating an operating direction and an operation amount of the arm. For example, the operation device 5 outputs, to the control unit 20, a swing operation signal indicating a swing direction and a swing amount of the upper swinging body with respect to the lower traveling body. For example, the operation device 5 outputs, to the control unit 20, a traveling operation signal for operating the traveling motor. For example, the operation device 5 outputs, to the control unit 20, a fuel dial signal indicating a throttle opening of the engine. For example, the operation device 5 outputs, to the control unit 20, a swinging and parking brake operation signal for operating engagement or disengagement of the swinging and parking brake.

The solenoid valve 6a performs an opening/closing operation, a direction switching operation, and the like by power supplied from the battery 4. The upstream side of the solenoid valve 6a is connected to the downstream side of the switching element 14F. The downstream side of the solenoid valve 6a is connected to a ground 17G.

The solenoid valve 6b performs an opening/closing operation, a direction switching operation, and the like by the power supplied from the battery 4. The upstream side of the solenoid valve 6b is connected to the downstream side of a switching element 15F. The downstream side of the solenoid valve 6b is connected to a ground 18G.

The solenoid valve 6a and the solenoid valve 6b are, for example, various solenoid valves provided in the work machine 1, such as a solenoid valve for switching a high and low levels of a traveling speed of the work machine 1, a solenoid valve for switching a relief pressure of an attachment, and a solenoid valve for switching an engagement or disengagement of the swinging and parking brake of the work machine 1.

The solenoid valve 6c performs an opening/closing operation, a direction switching operation, and the like by the power supplied from the battery 4. The upstream side of the solenoid valve 6c is connected to the downstream side of a switching element 13F. The downstream side of the solenoid valve 6c is connected to a ground 16G. The solenoid valve 6c is connected to the power source 2. The solenoid valve 6c controls the power source 2. More specifically, the solenoid valve 6c controls the tilt angle of the swash plate of the variable displacement pump 2P based on a control signal from the control unit 20.

[Controller]

The controller 10 is a controller of the work machine 1. The controller 10 outputs a signal to control the working equipment, the lower traveling body, and the upper swinging body of the work machine 1. The controller 10 outputs a drive control signal to the power source 2 to control the power source 2. When an abnormality occurs inside the controller 10, the controller 10 outputs a cutoff control signal to cut off a power supply from the battery 4. When it is determined that an abnormality has occurred in the power supply circuit connecting the controller 10 and the solenoid valve 6, the controller 10 outputs a command for controlling the power source 2 so as to limit an operation of the working equipment. The controller 10 includes the control unit 20. The electric signal line 101, an electric signal line 103, an electric signal line 104, and an electric signal line 105 are electrically connected to the controller 10. When it is determined that an abnormality has occurred in the power supply circuit connecting the controller 10 and the solenoid valve 6, the main controller 10 may output a command for controlling the power source 2 so as to limit the operations of the working equipment, the lower traveling body, and the upper swinging body.

In the present disclosure, when it is determined that an abnormality has occurred in the power supply circuit connecting the controller 10 and the solenoid valve 6, the controller 10 outputs a command for controlling the rotation speed of the engine 2E to be decreased. In the present disclosure, when it is determined that an abnormality has occurred in at least one of the power supply circuits connecting the controller 10 and each of the solenoid valve 6a, the solenoid valve 6b, and the solenoid valve 6c, the controller 10 outputs a command to the power source controller 30 so that, for example, the rotation speed of the engine 2E becomes equivalent to low idling.

In the present disclosure, when the controller 10 determines that an abnormality has occurred in the power supply circuit connecting the controller 10 and the solenoid valve 6, the controller 10 outputs a command for controlling a discharge amount of variable displacement pump 2P to be decreased. In the present disclosure, when the controller 10 determines that an abnormality has occurred in at least one of the power supply circuits connecting controller 10 and each of solenoid valve 6a, solenoid valve 6b, and solenoid valve 6c, the controller 10 outputs a control command for minimizing the discharge amount from the variable displacement pump 2P.

In the present disclosure, the controller 10 determines an abnormality of at least one of the power supply circuits connecting the controller 10 and each of the solenoid valve 6a, the solenoid valve 6b, and the solenoid valve 6c at a time during the key operation of the work machine 1. The time during the key operation of the work machine 1 is, for example, when the key is turned on or when the key is turned off. When the key is turned on, the work of the work machine 1 is started. When the key is turned off, the work of the work machine 1 is completed.

The controller 10 includes the switching elements 11F, 13F, 14F, and 15F, diodes 11D, 13D, 14D, 15D, 16D, 17D, and 18D, and the grounds 16G, 17G, and 18G.

The switching elements 11F, 13F, 14F, and 15F switch a conductive state and a non-conductive state of the circuits based on a command from the control unit 20. The switching elements 11F, 13F, 14F, and 15F are, for example, field effect transistors (FETs) or transistors.

The switching element 11F is provided to supply or cut off power from the battery 4. The switching element 11F is disposed between the downstream side of the battery 4 and the upstream side of the solenoid valve 6. A gate of the switching element 11F is connected to the control unit 20. When the switching element 11F is brought into the conductive state, power is supplied to the downstream side of the electric signal line 101. When the switching element 11F is brought into the non-conductive state, the power supply to the downstream side of the electric signal line 101 is cut off.

More specifically, when an ON electric signal is input as a switching signal to the switching element 11F, power can be supplied to the solenoid valve 6. When an OFF electric signal is input as the switching signal to the switching element 11F, the power supply to the solenoid valve 6 is cut off.

The switching element 13F is provided to drive the solenoid valve 6c. The switching element 13F is provided to switch the power supply to the solenoid valve 6c according to a command from the control unit 20. The switching element 13F is disposed between a terminal 101a and the ground 16G. A gate of the switching element 13F is connected to the control unit 20. When an abnormality such as a supply fault occurs, the switching element 13F is in the non-conductive state and cuts off the power supply to the solenoid valve 6c.

The switching element 14F is provided to drive the solenoid valve 6a. The switching element 14F is provided to switch the power supply to the solenoid valve 6a in accordance with a command from the control unit 20. The switching element 14F is disposed between a terminal 101b and the ground 17G. The gate of the switching element 14F is connected to the control unit 20. When an abnormality such as a supply fault occurs, the switching element 14F is in a non-conductive state and cuts off the power supply to the solenoid valve 6a.

The switching element 15F is provided to drive the solenoid valve 6b. The switching element 15F is provided to switch the power supply to the solenoid valve 6b according to a command from the control unit 20. The switching element 15F is disposed between a terminal 101c and the ground 18G. A gate of the switching element 15F is connected to the control unit 20. When an abnormality such as a supply fault occurs, the switching element 15F is brought into the non-conductive state to cut off the power supply to the solenoid valve 6b.

The electric signal line 101 electrically connects the battery 4 and the controller 10. The electric signal line 101 electrically connects the battery 4 and the control unit 20. The switching element 11F is connected to the electric signal line 101 from the battery 4 side.

The terminal 101a electrically connects the downstream side of the switching element 11F and the upstream side of the switching element 13F. The terminal 101b electrically connects the downstream side of the switching element 11F and the upstream side of the switching element 14F. The terminal 101c electrically connects the downstream side of the switching element 11F and the upstream side of the switching element 15F.

An electric signal line 101i electrically connects between the downstream side of the battery 4 and the upstream side of the switching element 11F and the control unit 20.

An electric signal line 101j electrically connects between the downstream side of the switching element 11F and the upstream side of the terminal 101a and the control unit 20.

An electric signal line 102 electrically connects the power source 2 and the power source controller 30.

The electric signal line 103 connects the downstream side of the switching element 13F and the upstream side of the solenoid valve 6c. The electric signal line 103 electrically connects the controller 10 and the solenoid valve 6c. The electric signal line 103 is a power supply circuit that connects the controller 10 and the solenoid valve 6c.

The electric signal line 104 connects the downstream side of the switching element 14F and the upstream side of the solenoid valve 6a. The electric signal line 104 electrically connects the controller 10 and the solenoid valve 6a. The electric signal line 104 is a power supply circuit that connects the controller 10 and the solenoid valve 6a.

The electric signal line 105 connects the downstream side of the switching element 15F and the upstream side of the solenoid valve 6b. The electric signal line 105 electrically connects the controller 10 and the solenoid valve 6b. The electric signal line 105 is a power supply circuit that connects the controller 10 and the solenoid valve 6b.

An electric signal line 106 electrically connects the downstream side of the switching element 13F and the control unit 20. The electric signal line 106 is electrically connected to the electric signal line 103.

An electric signal line 107 electrically connects the downstream side of the switching element 14F and the control unit 20. The electric signal line 107 is electrically connected to the electric signal line 104.

An electric signal line 108 electrically connects the downstream side of the switching element 15F and the control unit 20. The electric signal line 108 is electrically connected to the electric signal line 105.

[Control Unit]

The control unit 20 is supplied with electric power from the battery 4. The control unit 20 receives a signal from the operation device 5. The control unit 20 outputs a signal to the power source controller 30. The control unit 20 includes an abnormality monitoring unit 21, a cutoff control unit 22, a drive control unit 23, and an output unit 24.

The abnormality monitoring unit 21 monitors an abnormality such as the supply fault inside the controller 10. The abnormality monitoring unit 21 monitors, for example, a failure of the switching elements 11F, 13F, 14F, and 15F provided inside the controller 10. Any known method can be used as the method for determining the failure of the switching elements.

The abnormality monitoring unit 21 monitors an abnormality such as a supply fault of a power supply circuit outside the controller 10. The abnormality monitoring unit 21 monitors an occurrence of abnormality such as the supply fault in a power supply circuit connecting the controller 10 and the solenoid valve 6. As an example of the supply fault, as indicated by a broken line A in FIG. 1, the electric signal line 101 between the controller 10 and the battery 4 and the electric signal line 103 of the solenoid valve 6c are brought into an electrical conductive state. The abnormality monitoring unit 21 monitors voltages between the controller 10 and the solenoid valves 6a, 6b, and 6c. The abnormality monitoring unit 21 determines that an abnormality has occurred when a voltage equal to or higher than a threshold is applied to the solenoid valve 6a, the solenoid valve 6b, or the solenoid valve 6c in a state where the power supply from the electric signal line 103, the electric signal line 104, and the electric signal line 105, which are power supply circuits, to the solenoid valve 6a, the solenoid valve 6b, or the solenoid valve 6c is cut off by control of the control unit 20. When it is determined that a "feedback voltage equal to or higher than the threshold" is detected in a state where the power supply from the electric signal line 103, the electric signal line 104, and the electric signal line 105, which are the power supply circuits, to the solenoid valve 6a, the solenoid valve 6b, or the solenoid valve 6c is cut off by the control of the control unit 20, the abnormality monitoring unit 21 determines that an abnormality such as the supply fault has occurred. The feedback voltage may be detected by, for example, converting a current flowing through the electric signal line 103 into a voltage by the controller 10, and inputting and determining a voltage value after conversion by the CPU.

The abnormality monitoring unit 21 may monitor the abnormality of the power supply circuit outside the controller 10 as daily processing. In the present disclosure, the abnormality monitoring unit 21 monitors an occurrence of abnormality such as the supply fault in at least one of the electric signal line 103, the electric signal line 104, and the electric signal line 105, which are a power supply circuits connecting the controller 10 and each of the solenoid valve 6a, the solenoid valve 6b, and the solenoid valve 6c, at the time during the key operation of the work machine 1. The time during the key operation of the work machine 1 is, for example, when the key is turned on or when the key is turned off. When the key is turned on, the work of the work machine 1 is started. As a result, the abnormality in the work machine 1 can be detected at the start of work. When the key is turned off, the work of the work machine 1 is completed. The abnormality of the work machine 1 can be detected at the end of work. In this case, it is possible to request a service person who performs maintenance to inspect and repair the work machine 1 before the start of the next work.

The cutoff control unit 22 controls the power supply from the battery 4. More specifically, the cutoff control unit 22 switches on and off of the switching element 11F. When the abnormality monitoring unit 21 detects an abnormality such as the supply fault inside the controller 10, the cutoff control unit 22 outputs the OFF electric signal as a switching signal to the switching element 11F in order to cut off the power supply from the battery 4. When the abnormality monitoring unit 21 does not detect an abnormality such as the supply fault inside the controller 10, the cutoff control unit 22 outputs the ON electric signal to the switching element 11F as a switching signal.

The drive control unit 23 controls the solenoid valve 6a. More specifically, the drive control unit 23 switches the switching element 14F between on and off. When the abnormality monitoring unit 21 detects an abnormality such as the supply fault inside the controller 10, the drive control unit 23 outputs the OFF electric signal as a switching signal to the switching element 14F in order to shut off the solenoid valve 6a.

The drive control unit 23 controls the solenoid valve 6b. More specifically, the drive control unit 23 switches the switching element 15F between on and off. When the abnormality monitoring unit 21 detects an abnormality such as the supply fault inside the controller 10, the drive control unit 23 outputs the OFF electric signal as a switching signal to the switching element 15F in order to shut off the solenoid valve 6b.

The drive control unit 23 controls the solenoid valve 6c. More specifically, the drive control unit 23 switches the switching element 13F between on and off. When the abnormality monitoring unit 21 detects an abnormality such as the supply fault inside the controller 10, the drive control unit 23 outputs the OFF electric signal as a switching signal to the switching element 13F in order to shut off the solenoid valve 6c.

The drive control unit 23 controls at least one of the solenoid valve 6a, the solenoid valve 6b, and the solenoid valve 6c based on the control signal output from the operation device 5.

The output unit 24 outputs a control command to the power source controller 30 so as to suppress the power source 2. More specifically, when the abnormality monitoring unit 21 determines that an abnormality has occurred in the power supply circuit connecting the controller 10 and the solenoid valve 6, the output unit 24 outputs, to the power source controller 30, the control command for controlling the power source 2 so as to limit the operation of the working equipment. In the present disclosure, when the abnormality monitoring unit 21 determines that an abnormality has occurred in at least one of the electric signal line 103, the electric signal line 104, and the electric signal line 105, which are power supply circuits connecting the controller 10 and each of the solenoid valve 6a, the solenoid valve 6b, and the solenoid valve 6c, the output unit 24 outputs, to the power source controller 30, the control command for controlling the power source 2 so as to limit the operations of the working equipment, the lower traveling body, and the upper swinging body.

In the present disclosure, when it is determined that an abnormality has occurred in at least one of the electric signal line 103, the electric signal line 104, and the electric signal line 105, which are power supply circuits connecting the controller 10 and each of the solenoid valve 6a, the solenoid valve 6b, and the solenoid valve 6c, the output unit 24 outputs a command for controlling the rotation speed of the engine 2E to be decreased. For example, in the present disclosure, when the abnormality monitoring unit 21 determines that an abnormality has occurred in at least one of the power supply circuits connecting the controller 10 and each of the solenoid valve 6a, the solenoid valve 6b, and the solenoid valve 6c, the output unit 24 outputs a command for controlling the rotation speed of the engine 2E to be equivalent to the low idling.

In the present disclosure, when it is determined that an abnormality has occurred in at least one of the electric signal line 103, the electric signal line 104, and the electric signal line 105, which are power supply circuits connecting the controller 10 and each of the solenoid valve 6a, the solenoid valve 6b, and the solenoid valve 6c, the output unit 24 outputs a command for controlling the discharge amount of the variable displacement pump 2P to be decreased. For example, in the present disclosure, when the abnormality monitoring unit 21 determines that an abnormality has occurred in at least one of the electric signal line 103, the electric signal line 104, and the electric signal line 105, which are power supply circuits connecting the controller 10 and each of the solenoid valve 6a, the solenoid valve 6b, and the solenoid valve 6c, the output unit 24 outputs a control command for minimizing the discharge amount from the variable displacement pump 2P.

[Power Source Controller]

The power source controller 30 is a controller that controls the power source 2. The power source controller is electrically connected to the control unit 20 and the power source 2. The electric signal line 102 is electrically connected to the power source controller 30. The power source controller 30 outputs a control signal for controlling the power source 2. The power source controller 30 is provided for each power source 2. For example, when the power source 2 is the engine 2E, the power source controller 30 is an engine controller. For example, when the power source 2 is a generator, the power source controller 30 is a generator controller. For example, when the power source 2 is a fuel cell, the power source controller 30 is a fuel cell controller.

When the power source controller 30 receives a command from the output unit 24 of the control unit 20, the power source controller 30 outputs a control signal for suppressing the power source 2 to the power source 2. When the abnormality monitoring unit 21 determines that an abnormality has occurred in the power supply circuit connecting the controller 10 and the solenoid valve 6, a command is input from the output unit 24 to the power source controller 30.

The power source controller 30 outputs, to the power source 2, a control signal for controlling the power source 2 so as to limit the operation of the working equipment based on the command from the output unit 24.

In the present disclosure, when the abnormality monitoring unit 21 of the control unit 20 determines that an abnormality has occurred in at least one of the electric signal line 103, the electric signal line 104, and the electric signal line 105, which are power supply circuits connecting the controller 10 and each of the solenoid valve 6a, the solenoid valve 6b, and the solenoid valve 6c, the power source controller 30 outputs, to the power source 2, a control signal for controlling the rotation speed of the engine 2E to be decreased. For example, in the present disclosure, the power source controller 30 outputs, to the power source 2, a control signal for controlling the rotation speed of the engine 2E to be equivalent to the low idling based on the command from the output unit 24.

In the present disclosure, when the abnormality monitoring unit 21 of the control unit 20 determines that an abnormality has occurred in at least one of the electric signal line 103, the electric signal line 104, and the electric signal line 105, which are power supply circuits connecting the controller 10 and each of the solenoid valve 6a, the solenoid valve 6b, and the solenoid valve 6c, the power source controller 30 outputs, to the power source 2, a control signal for controlling the discharge amount of the variable displacement pump 2P to be decreased. For example, in the present disclosure, the power source controller 30 outputs, to the power source 2, a control signal for minimizing the discharge amount from the variable displacement pump 2P based on a command from the output unit 24.

The power source controller 30 outputs, to the power source 2, a control signal for controlling the power source 2 so as to limit the operations of the working equipment, the lower traveling body, and the upper swinging body based on a command from the output unit 24.

[Computer System]

Figure 2:
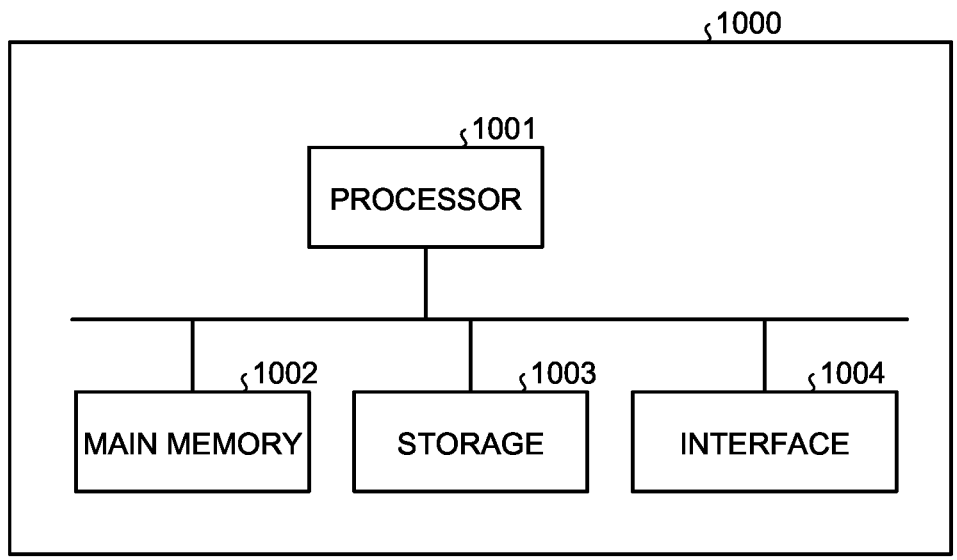
FIG. 2 is a block diagram illustrating a computer system according to the first embodiment.

FIG. 2 is a block diagram illustrating a computer system 1000 according to the first embodiment. The controller 60 described above includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The above-described functions of the controller 10 is stored in the storage 1003 as a program. The processor 1001 reads the program from the storage 1003, develops the program into the main memory 1002, and executes the above-described process according to the program. The program may be distributed to the computer system 1000 via a network.

[Control Process of Work Machine]

Figure 3:
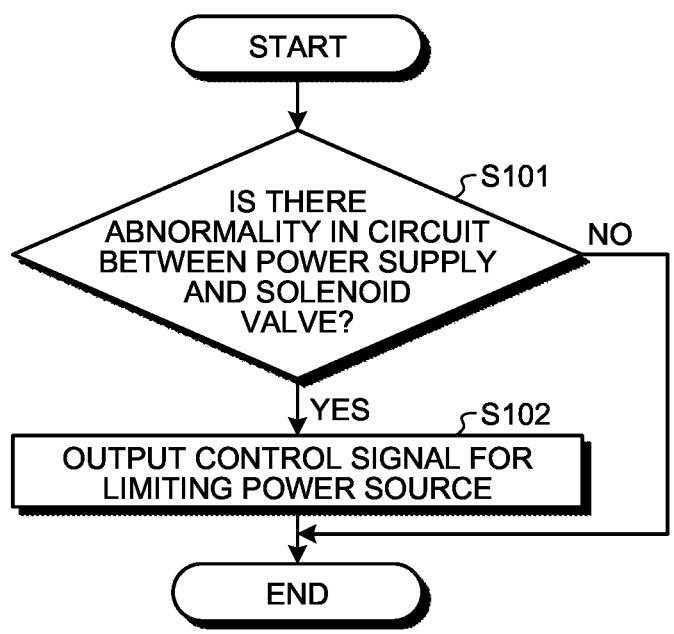
FIG. 3 is a flowchart illustrating a method for controlling a work machine according to the first embodiment.

Next, a processing procedure of the embodiment will be described with reference to a flowchart illustrated in FIG. 3. FIG. 3 is a flowchart illustrating a control method performed by the controller 10 of the work machine 1 according to the first embodiment. In the present disclosure, a process illustrated in FIG. 3 is executed when the key of the work machine 1 is turned on or turned off.

The abnormality monitoring unit 21 determines whether there is an abnormality in the power supply circuit that connects the controller 10, which is the power supply, and the solenoid valve 6 (Step S101). More specifically, the abnormality monitoring unit 21 determines that an abnormality has occurred when the voltage equal to or higher than the threshold is applied to the solenoid valve 6a, the solenoid valve 6b, or the solenoid valve 6c in a state where power supply from the electric signal line 103, the electric signal line 104, and the electric signal line 105, which are power supply circuits, to the solenoid valve 6a, the solenoid valve 6b, or the solenoid valve 6c is cut off by the control of the control unit 20. A swing control unit 11 determines that an abnormality has occurred when the "feedback voltage equal to or higher than the threshold" is detected in a state where the power supply from the electric signal line 103, the electric signal line 104, and the electric signal line 105, which are power supply circuits, to the solenoid valve 6a, the solenoid valve 6b, or the solenoid valve 6c is cut off by the control of the control unit 20. When it is determined that there is an abnormality (Yes in Step S101), the abnormality monitoring unit 21 proceeds to Step S102. When it is determined that there is no abnormality (No in Step S101), the abnormality monitoring unit 21 ends the process.

When it is determined that there is an abnormality (Yes in Step S101), the output unit 24 outputs, to the power source controller 30, a command for controlling the power source 2. More specifically, the output unit 24 outputs, for example, a command for controlling the rotation speed of the engine 2E to be equivalent to the low idling. For example, the output unit 24 outputs a control command for minimizing the discharge amount from the variable displacement pump 2P.

When a command for controlling the power source 2 is output from the output unit 24 to the power source controller 30, the operator is notified that the abnormality has occurred in the power supply circuit outside the controller 10. For example, a message image or the like for notifying an occurrence of abnormality in the power supply circuit outside the controller 10 is output to a monitor provided in the cab of the work machine 1. For example, a buzzer provided in the cab of the work machine 1 is sounded to notify an occurrence of abnormality in the power supply circuit outside the controller 10. The operator can confirm that the operations of the working equipment, the lower traveling body, and the upper swinging body of the work machine 1 are limited.

As described above, in the present disclosure, when the controller 10 determines that an abnormality has occurred in the power supply circuit outside the controller 10, i.e., the power supply circuit connecting the controller 10 and the solenoid valve 6, a command for controlling the power source 2 is output so as to limit the operations of the working equipment, the lower traveling body, and the upper swinging body. The operation of the work machine 1 is limited to the same extent as in the low idling state, and a work such as excavation is limited. The operator can move the work machine 1 to a safe place.

Effects

As described above, in the present disclosure, when it is determined that an abnormality has occurred in at least one of the electric signal line 103, the electric signal line 104, and the electric signal line 105, which are power supply circuits connecting the controller 10 and each of the solenoid valve 6a, the solenoid valve 6b, and the solenoid valve 6c, a command for controlling the power source 2 is output so as to limit the operations of the working equipment, the lower traveling body, and the upper swinging body. In the present disclosure, when an abnormality occurs in the power supply circuit outside the controller 10, the power source 2 can be controlled to limit the operations of the working equipment, the lower traveling body, and the upper swinging body. As described above, according to the present disclosure, the work machine 1 can be controlled to further enhance safety not only when an abnormality occurs inside the controller 10 but also when an abnormality occurs in the power supply circuit outside the controller 10.

In the present disclosure, when it is determined that an abnormality has occurred in at least one of the electric signal line 103, the electric signal line 104, and the electric signal line 105, which are power supply circuits connecting the controller 10 and each of the solenoid valve 6a, the solenoid valve 6b, and the solenoid valve 6c, a command for controlling the engine 2E is output, so that the rotation speed of the engine 2E becomes the low idling. According to the present disclosure, since the rotation speed of the engine 2E is suppressed, the operations of the working equipment, the lower traveling body, and the upper swinging body can be limited.

In the present disclosure, when it is determined that an abnormality has occurred in at least one of the electric signal line 103, the electric signal line 104, and the electric signal line 105, which are power supply circuits connecting the controller 10 and each of the solenoid valve 6a, the solenoid valve 6b, and the solenoid valve 6c, a command for controlling the discharge amount from the variable displacement pump 2P is output, so that the discharge amount is minimized. According to the present disclosure, the operation of the working equipment, the lower traveling body, and the upper swinging body can be limited by limiting the discharge amount from the variable displacement pump 2P.

In the present disclosure, abnormality of at least one of the electric signal line 103, the electric signal line 104, and the electric signal line 105, which is a power supply circuit connecting the controller 10 and each of the solenoid valve 6a, the solenoid valve 6b, and the solenoid valve 6c, is determined at the time during the key operation of the work machine 1. According to the present disclosure, it is possible to determine an abnormality of the power supply circuit outside the controller 10 at the start or end of the work of the work machine 1. When an abnormality is determined at the start of work, work such as excavation by the work machine 1 can be prevented from being performed. In this case, it is possible to suppress malfunction of the work machine 1 during work. In a case where an abnormality is determined at the end of work, it is possible to request an inspection and repair of the work machine 1 by a service person who performs maintenance before the start of the next work.

In the present disclosure, the notification unit notifies that an abnormality has occurred in at least one of the electric signal line 103, the electric signal line 104, and the electric signal line 105, which are power supply circuits connecting the controller 10 and each of the solenoid valve 6a, the solenoid valve 6b, and the solenoid valve 6c. According to the present disclosure, the operator can confirm that the operations of the working equipment, the lower traveling body, and the upper swinging body of the work machine 1 are limited.

Second Embodiment

Figure 4:
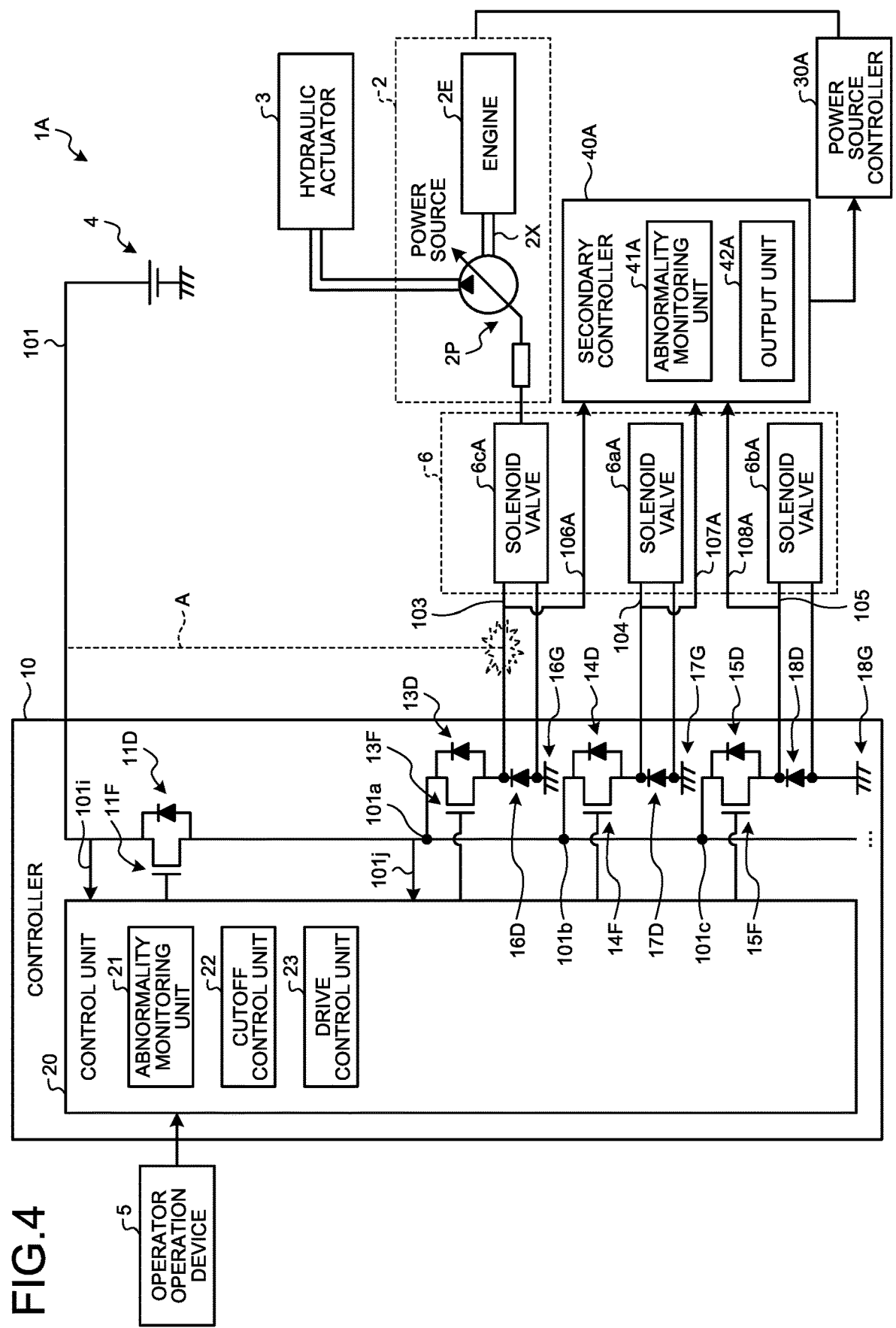
FIG. 4 is a schematic block diagram illustrating a work machine according to a second embodiment.

FIG. 4 is a schematic block diagram of a work machine 1A according to a second embodiment. In the following description, the same or equivalent components as those of the above-described embodiment are denoted by the same reference signs, and the description thereof is simplified or omitted.

The work machine 1A includes the controller 10, a power source controller 30A, and a secondary controller 40A.

The control unit 20 of the controller 10 includes the abnormality monitoring unit 21, the cutoff control unit 22, and the drive control unit 23. Among the functions of the abnormality monitoring unit 21 of the first embodiment, the abnormality monitoring unit 21 has a function of monitoring an abnormality such as a supply fault inside the controller 10. The cutoff control unit 22 and the drive control unit 23 have functions similar to those of the first embodiment.

The power source controller 30A is electrically connected to the secondary controller 40A and the power source 2. The power source controller 30A outputs a control signal for controlling the power source 2 based on the control signal from the secondary controller 40A.

[Secondary Controller]

The secondary controller 40A includes an abnormality monitoring unit 41A and an output unit 42A. A solenoid valve 6aA is electrically connected to the secondary controller 40A via an electric signal line 107A connected to an electric signal line 104. A solenoid valve 6bA is electrically connected to the secondary controller 40A via an electric signal line 108A connected to the electric signal line 105. A solenoid valve 6cA is electrically connected to the secondary controller 40A via an electric signal line 106A connected to the electric signal line 103. The secondary controller 40A receives signals from the solenoid valve 6aA, the solenoid valve 6bA, and the solenoid valve 6cA.

The abnormality monitoring unit 41A has a function of monitoring an abnormality of a power supply circuit outside the controller 10 among the functions of the abnormality monitoring unit 21 of the first embodiment. In the present disclosure, the abnormality monitoring unit 41A determines an abnormality in at least one of the electric signal line 103, the electric signal line 104, and the electric signal line 105, which are power supply circuits connecting the controller 10 and each of the solenoid valve 6$a$A, the solenoid valve 6$b$A, and the solenoid valve 6$c$A.

The output unit 42A has the same function as the output unit 24 of the first embodiment.

As described above, in the present disclosure, the secondary controller 40A can detect that an abnormality has occurred in the power supply circuit outside the controller 10. According to the present disclosure, the work machine 1A can be controlled to further enhance safety not only when an abnormality occurs inside the controller 10 but also when an abnormality occurs in a power supply circuit outside the controller 10.

REFERENCE SIGNS LIST

1 WORK MACHINE
2 POWER SOURCE
2E ENGINE
2P VARIABLE DISPLACEMENT PUMP
2X DRIVE SHAFT
3 HYDRAULIC ACTUATOR
4 BATTERY
5 OPERATION DEVICE
6, 6$a$, 6$b$, 6$c$ SOLENOID VALVE
10 CONTROLLER (FIRST CONTROLLER)
11D, 13D, 14D, 15D, 16D, 17D, 18D DIODE
11F, 13F, 14F, 15F SWITCHING ELEMENT
16G, 17G, 18G GROUND
20 CONTROL UNIT
21 ABNORMALITY MONITORING UNIT
22 CUTOFF CONTROL UNIT
23 DRIVE CONTROL UNIT
24 OUTPUT UNIT
30 POWER SOURCE CONTROLLER
101, 101$i$, 101$j$, 102, 103, 104, 105, 106, 107, 108 ELECTRIC SIGNAL LINE
101$a$, 101$b$, 101$c$ TERMINAL

The invention claimed is:

1. A work machine having working equipment, the work machine comprising:
   a power source that outputs a driving force for operating the working equipment;
   a controller; and
   a solenoid valve controlled by the controller, wherein
   the controller outputs a command for controlling the power source so as to limit an operation of the working equipment when it is determined that an abnormality has occurred in an electrical signal line of a power supply circuit connecting the controller and the solenoid valve.

2. The work machine according to claim 1, wherein
   the power source is an engine, and
   the controller outputs a command for controlling a rotation speed of the engine to be decreased when it is determined that an abnormality has occurred in the power supply circuit connecting the controller and the solenoid valve.

3. The work machine according to claim 1, wherein
   the power source is a variable displacement pump, and
   the controller outputs a command for controlling a discharge amount of the variable displacement pump to be decreased when it is determined that an abnormality has occurred in the power supply circuit connecting the controller and the solenoid valve.

4. The work machine according to claim 3, wherein
   the controller suppresses the discharge amount by changing a tilt angle of a swash plate of the variable displacement pump.

5. The work machine according to claim 1, wherein
   the controller determines an abnormality of the power supply circuit between the controller and the solenoid valve at a time during a key operation of the work machine.

6. The work machine according to claim 5, wherein
   the time during the key operation of the work machine is when a key is turned on.

7. The work machine according to claim 5, wherein
   the time during the key operation of the work machine is when a key is turned off.

8. The work machine according to claim 1, further comprising
   a buzzer for notifying an occurrence of abnormality in the power supply circuit connecting the controller and the solenoid valve,
   wherein the controller makes the buzzer sound when it is determined that an abnormality has occurred in the power supply circuit connecting the controller and the solenoid valve.

9. The work machine according to claim 1, wherein
   the power source outputs a driving force for operating the working equipment, a lower traveling body, and an upper swinging body, and
   the controller outputs a command for controlling the power source so as to limit operations of the working equipment, the lower traveling body, and the upper swinging body when it is determined that an abnormality has occurred in the power supply circuit connecting the controller and the solenoid valve.

10. The work machine according to claim 1, wherein the power source is an engine,
    wherein the controller outputs a command for controlling the engine so as to make a rotation speed of the engine become equivalent to low idling when an abnormality has occurred in a power supply circuit connecting the controller and the solenoid valve.

11. The work machine according to claim 1, wherein the power source is an electric motor,
    wherein the controller outputs a command for controlling the electric motor so as to limit an operation of the working equipment when an abnormality has occurred in the power supply circuit connecting the controller and the solenoid valve.

12. The work machine according to claim 1, wherein the power source includes
    a variable displacement pump,
    wherein the controller monitors an occurrence of abnormality in a power supply circuit connecting the controller and the solenoid valve and outputs a command for controlling a discharge amount of the variable displacement pump to be decreased when an abnormality has occurred in the power supply circuit connecting the controller and the solenoid valve.

13. The work machine according to claim 1, further comprising:
    a monitor provided in a cab,
    wherein the controller outputs a message image to the monitor for notifying an occurrence of abnormality when it is determined that an abnormality has occurred in the power supply circuit connecting the controller and the solenoid valve.

14. The work machine according to claim 1, wherein the abnormality includes an electrical fault abnormality, and wherein an abnormality is determined when a power supply voltage is equal to or higher than a predetermined threshold voltage.

15. A method for controlling a work machine having working equipment, the method comprising:
    outputting a command for controlling a power source so as to limit an operation of the working equipment when it is determined that an abnormality has occurred in an electrical signal line of a power supply circuit connecting a controller and a solenoid valve, the controller controlling the solenoid valve.

16. A work machine having working equipment, the work machine comprising:
    a power source that outputs a driving force for operating the working equipment, the power source including one or more of an engine and/or an electric motor,
    a controller;
    a solenoid valve controlled by the controller; and
    wherein, in response to an abnormality occurring in an electrical signal line of a power supply line, the controller outputs a command for controlling the power source to limit operation of the power source by one or more of: decreasing rotation of the engine and/or limiting operation of the electric motor.

17. The work machine according to claim 16, wherein the abnormality includes an electrical fault abnormality, and wherein an abnormality is determined when a power supply voltage is equal to or higher than a predetermined threshold voltage.

* * * * *